(12) United States Patent
Kim (10) Patent No.: US 8,307,376 B2
(45) Date of Patent: Nov. 6, 2012

(54) AUXILIARY OUTPUT DEVICE, PORTABLE COMPUTER HAVING THE SAME, AND METHOD FOR SWITCHING OPERATING SYSTEMS OF THE SAME

(75) Inventor: Dae Ho Kim, Yongin-si (KR)

(73) Assignee: LG Electronics Inc., Seoul (KR)

(*) Notice: Subject to any disclaimer, the term of this patent is extended or adjusted under 35 U.S.C. 154(b) by 1109 days.

(21) Appl. No.: 12/059,295

(22) Filed: Mar. 31, 2008

(65) Prior Publication Data

US 2009/0031329 A1 Jan. 29, 2009

(30) Foreign Application Priority Data

Jul. 25, 2007 (KR) .................. 10-2007-0074772

(51) Int. Cl.
*G06F 3/00* (2006.01)
*G06F 9/46* (2006.01)
*G06F 13/00* (2006.01)
(52) U.S. Cl. .................................................. 719/327
(58) Field of Classification Search .................. 719/327
See application file for complete search history.

(56) References Cited

U.S. PATENT DOCUMENTS

| | | | |
|---|---|---|---|
| 2002/0085835 A1* | 7/2002 | Zhang et al. | 386/124 |
| 2003/0089217 A1* | 5/2003 | Suzuki | 84/609 |
| 2005/0066207 A1* | 3/2005 | Fleck et al. | 713/320 |
| 2005/0243019 A1* | 11/2005 | Fuller et al. | 345/1.3 |
| 2005/0243021 A1* | 11/2005 | Perez et al. | 345/1.3 |
| 2006/0007051 A1* | 1/2006 | Bear et al. | 345/1.1 |
| 2007/0130399 A1* | 6/2007 | Anderson et al. | 710/62 |
| 2008/0235527 A1* | 9/2008 | Heller et al. | 713/320 |
| 2008/0297433 A1* | 12/2008 | Heller et al. | 345/2.1 |

\* cited by examiner

*Primary Examiner* — Andy Ho
*Assistant Examiner* — Timothy A. Mudrick
(74) *Attorney, Agent, or Firm* — Birch, Stewart, Kolasch & Birch, LLP (57) ABSTRACT

A method for switching from an OS of a portable computer to another OS of an auxiliary output device, and the portable computer containing the auxiliary output device, are discussed. According to an embodiment, the auxiliary input/output device includes a control unit configured to control a data storage unit of the portable computer once an OS switching signal is generated in a main device of the portable computer; and an interface unit configured to enable communication between the main device and the auxiliary input/output device, wherein in response to the OS switching signal, the control unit is configured to execute a task that a main controller of the main device has been executing.

8 Claims, 8 Drawing Sheets

| | OS Swithching signal generating event | Description/example |
|---|---|---|
| 60 | Manual selection by user | When user selects a menu item |
| 62 | When portable computer is in suspended mode or stan by mode | Such detection can be made by main OS |
| 64 | When portable computer is closed | Status or LID switch can be checked to make this detection |
| 66 | When computer systems power is off | Controller or main OS can make such detection |
| 68 | Battery capacity | When battery level of portable computer is low |

AUXILIARY OUTPUT DEVICE, PORTABLE COMPUTER HAVING THE SAME, AND METHOD FOR SWITCHING OPERATING SYSTEMS OF THE SAME

This nonprovisional application claims the priority benefit of Korean Patent Application No. 10-2007-0074772 filed on Jul. 25, 2007, the entirety of which are hereby incorporated by reference.

BACKGROUND OF THE INVENTION

1. Field of the Invention

The present invention relates to a portable computer having an auxiliary output device, and more particularly to a method for switching from an OS (Operating System) of the portable computer to another OS of the auxiliary output device.

2. Description of the Related Art

As generally known in the art, conventional portable computers are equipped with an output unit, which includes an LCD window positioned inside the cover of the computer body and a speaker. When such a portable computer is to be used for a specific task the entire computer must be driven. This means that, even if no display is necessary, the display device is inevitably driven.

As such, conventional portable computers have a problem in that, since the entire computer must be driven for every task, the power consumption increases. This shortens the life time of the computer.

In addition, it is not possible to perform or continue to perform a specific task with the cover (top) of the conventional computer closed. Particularly, users on the move cannot perform or continue to perform even a simple task, e.g. listening to music, with the cover closed.

SUMMARY OF THE INVENTION

Accordingly, the present invention has been made to address the above-mentioned and other problems occurring in the related art, and the present invention provides a portable computer equipped with an auxiliary output device having its own OS which can be run even after the main OS of the computer is terminated.

The present invention also provides a portable computer having an auxiliary output device adapted in such a manner that, when the OSs are to be switched while the computer is executing a multimedia task, the OSs can be switched while the auxiliary output device continues the task that has been executed.

In accordance with an aspect of the present invention, there is provided an auxiliary input/output device provided in a portable computer and driven by a separate OS, the device including a control unit for controlling a data storage unit of the portable computer when an OS switching signal is inputted; and an interface unit for enabling communication between the portable computer and the auxiliary input/output device, wherein the control unit is adapted to execute a task when the OS switching signal is inputted while a main controller of the portable computer is executing the task.

According to embodiments, the control unit is adapted to play multimedia files, when the main controller has been playing the multimedia files, after a point of time of playback by the main controller. The control unit is adapted to receive flag information set by the main controller and to determine a multimedia playback location. The control unit is adapted to receive a play list from the main controller and play the multimedia files in an order based on the play list. The interface unit includes a first interface for connecting an embedded controller of the portable computer to the control unit; and a second interface for connecting the data storage unit of the portable computer to the control unit. The auxiliary input/output device further includes a data memory for storing data transmitted by the main controller. The data memory can be a flash memory, ADD memory or other non-volatile memory.

The data memory is adapted to receive and store multimedia data coming after a flag set by the main controller when the data transmitted by the main controller is multimedia data. The control unit is adapted to play multimedia files stored in the data memory. The auxiliary input/output device further includes an output unit for outputting the multimedia files when the multimedia files are played. The multimedia files can be, e.g., songs with or without lyrics (which can be displayed), movies, etc.

The output unit includes a display unit including an LCD positioned on a side of an upper surface of the portable computer. The display unit is a touch screen adapted to conduct input and output simultaneously.

In accordance with another aspect of the present invention, there is provided a portable computer including a main controller provided in the portable computer to control the portable computer; a data storage unit for storing user data comprising multimedia files; an auxiliary output device driven by a separate OS and adapted to selectively control the data storage unit in connection with the main controller; an embedded controller for controlling driving of the auxiliary output device according to a control signal from the main controller; and au interface for connecting the embedded controller to the auxiliary output device, wherein the auxiliary output device comprises a control unit for controlling the data storage unit of the portable computer when an OS switching signal is inputted, and the control unit is adapted to execute a task when the OS switching signal is inputted while the main controller is executing the task.

According to an embodiment, the auxiliary output device further includes a data memory for storing data transmitted by the maul controller.

In accordance with another aspect of the present invention, there is provided a method for switching OSs of a portable computer having an auxiliary output device, the method including the steps of (A) receiving an input of an OS switching signal; (B) determining whether or not a main controller of the portable computer is playing a multimedia file; (C) transmitting playback information to the auxiliary output device when the main controller is playing the multimedia file; (D) setting up a flag indicating a playback termination location of the multimedia file currently played; (E) terminating playback of the multimedia file and transmitting a termination signal to the auxiliary output device; (F) establishing control over a data storage unit by the auxiliary output device after receiving the termination signal; and (G) playing the multimedia file from a flag setup location by the auxiliary output device after obtaining control over the data storage unit.

According to embodiments, the playback information includes play list information registered in a multimedia execution application. The flag is indicated on data of the multimedia file. The flag is information indicated on the entire play list in terms of time.

In accordance with another aspect of the present invention, there is provided a method for switching OSs of a portable computer having an auxiliary output device, the method including comprising the steps of (a) receiving an input of an OS switching signal; (b) determining whether or not a main controller of the portable computer is playing a multimedia file; (c) transmitting playback information to the auxiliary output device when the main controller is playing the multimedia file; (d) setting up a flat indicating a playback termination location regarding the multimedia file currently played and transmitting flag information to the auxiliary output device; (e) terminating playback of the multimedia file and transmitting a termination signal to the auxiliary output device; (f) playing the multimedia file from a flag setup location by the auxiliary output device after receiving the termination signal; and (g) establishing control over a data storage unit by the auxiliary output device.

According to an embodiment in step (d), the flag is setup at a multimedia file playback location coming after a setup time (T) determined based on consideration of driving time of the auxiliary output device, and step (e) includes the steps of (e1) determining whether or not the multimedia file playback location coincides with the flag setup location; (e2) continuing playback until the multimedia file playback location coincides with the flag setup location when it has been determine step (e1) that the multimedia file playback location precedes the flag setup location; and (e3) terminating playback of the multimedia file and transmitting a termination signal to the auxiliary output device when it has been determined in step (e1) that the multimedia file playback location coincides with the flag setup location.

According to an embodiment, the playback information includes play list information registered in a multimedia execution application.

In accordance with another aspect of the present invention, there is provided a method for switching OSs of a portable computer having an auxiliary output device, the method including the steps of (I) receiving an input of an OS switching signal; (II) determining whether or not a main controller of the portable computer is playing a multimedia file; (III) transmitting playback information to the auxiliary output device when the main controller is playing the multimedia file; (IV) transmitting the multimedia file contained in the playback information to the auxiliary output device; (V) receiving and storing the multimedia file by the auxiliary output device; (VI) transmitting a storage completion signal to the main controller after storage is completed in step (VI); (VII) setting up a flag indicating a playback termination location regarding currently placed multimedia file by the main controller after receiving the storage completion signal; (VIII) terminating playback of the multimedia file and transmitting a termination signal to the auxiliary output device; and (IX) playing the stored multimedia file from a flag setup location by the auxiliary output device after receiving the termination signal.

In step (IV), the transmitted multimedia file is one of multimedia files on the play list to be played after transmission.

According to an embodiment, the OS switching signal is sent when the portable computer switches to a sleep mode. The OS switching signal is sent when the portable computer is powered off.

In accordance with another aspect of the present invention, there is provided a method for switching from an OS of a main controller to an OS of an auxiliary output device in a portable computer, the auxiliary output device being driven by its own OS, the method including the steps of receiving a play list of multimedia files from the main controller by the auxiliary output device when the portable computer is playing a multimedia file; and continuously playing the multimedia file after a point of time of OS switching.

According to an embodiment, the main controller sets up a flag at a multimedia file playback location before OS switching and transmits the flag information to the auxiliary output device, and the auxiliary output device determines a location for starting playback of the multimedia file by using the flag information.

According to an aspect of the present invention, there is provided an auxiliary input/output device provided in a portable computer and driven by a first operating system (OS), the portable computer including a main device driven by a second OS separate from the first OS, the auxiliary input/output device comprising: a control unit configured to control a data storage unit of the portable computer once an OS switching signal is generated in the main device; and an interface unit configured to enable communication between the main device and the auxiliary input/output device, wherein in response to the OS switching signal, the control unit is configured to execute a task that a main controller of the main device has been executing.

According to another aspect of the present invention, there is provided a portable computer comprising: a main device configured to be driven by a first operating system (OS) and to control operations of the portable computer; and an auxiliary output device configured to be driven by a second OS different from the first OS, wherein the main device comprises a main controller, an embedded controller configured to control driving of the auxiliary output device according to a control signal from the main controller, and a data storage unit configured to store data comprising multimedia files; and wherein the auxiliary output device comprises a control unit configured to control the data storage unit once an OS switching signal is generated in the main device, and in response to the OS switching signal, the control unit is configured to execute a task that the main controller has been executing.

According to another aspect of the present invention, there is provided a portable computer comprising: a main device configured to be driven by a main operating system (OS), and comprising a main controller, a main data storage unit, a main display unit and a main input unit; and an auxiliary device configured to be driven by an auxiliary OS, and comprising an auxiliary controller, an auxiliary data storage unit, an auxiliary display unit and an auxiliary input unit wherein upon occurrence of a predetermined event an OS switching signal is generated, upon generation of the OS switching signal, running of the man OS is terminated and running of the auxiliary OS is started, and upon generation of the OS switching signal, a task that was being performed by the main device is terminated and the same task is picked up and continuously performed by the auxiliary device.

According to another aspect of the present invention, there is provided a method for switching between operating systems (OSs) of a portable computer having a main device and an auxiliary output device, the method comprising: determining whether or not a main controller of the main device is playing a multimedia file, when an OS switching signal is generated; transmitting playback information to the auxiliary output device when the determining step determines the main controller is playing the multimedia file; setting up a flag indicating a playback termination location of the multimedia file currently being played; terminating a playback of the multimedia file and transmitting a termination signal to the auxiliary output device; establishing control over a data storage unit by the auxiliary output device after receiving the termination signal; and playing the multimedia file from the flag setup location by the auxiliary output device after obtaining control over the data storage unit.

According to another aspect of the present invention, there is provided a method for switching between operation systems (OSs) of a portable computer having a main device and an auxiliary output device, the method comprising: determining whether or not a main controller of the main device is playing a multimedia file when an OS switching signal is generated; transmitting playback information to the auxiliary output device when the determining step determines the main controller is playing the multimedia file; transmitting at least one multimedia file associated with the playback information to the auxiliary output device; receiving and storing the multimedia a file by the auxiliary output device; transmitting a storage completion signal to the main controller after the storing of the multimedia file is completed; setting up a flag indicating a playback termination location regarding the multimedia file by the main controller after receiving the storage completion signal; terminating a playback of the multimedia file and transmitting a termination sign to the auxiliary output device; and playing the stored multimedia file from the flag setup location by the auxiliary output device after receiving the termination signal.

According to another aspect of the present invention, there is provided a method for switching between operating systems (OSs) of a portable computer having a main device and an auxiliary output device, the method comprising: determining whether or not a main controller of the main device is playing a multimedia file; transmitting playback information to the auxiliary output device when the determining step determines the main controller is playing the multimedia file; setting up a flat indicating a playback termination location regarding the multimedia file currently being played, and transmitting flag information pertaining to the flag to the auxiliary output device; terminating a playback of the multimedia file and transmitting a termination signal to the auxiliary output device; playing the multimedia file from the flag setup location by the auxiliary output device after receiving the termination signal; and establishing control over a data storage unit of the main device by the auxiliary output device.

According to another aspect of the present invention, there is provided a method for switching from an OS of a main controller to an OS of an auxiliary output device in a portable computer, the auxiliary output device being driven by its own OS, the method comprising: generating an OS switching signal when a certain event occurs; once the OS switching signal is generated, receiving a play list of multimedia files from the main controller by the auxiliary output device when the portable computer is playing an audio and/or video file; once the OS switching signal is generated switching from the OS of the main controller to the OS of the auxiliary output device; and continuously playing, by the auxiliary output device, the audio and/or video file after a point of time of the OS switching.

The present invention constructed as mentioned above is advantageous in that, even when the portable computer stops driving, the currently run multimedia file is outputted via the auxiliary output device with no separate operation.

BRIEF DESCRIPTION OF TEE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. In the following description and drawings, the same reference numerals are preferably used to designate the same or similar components, and so repetition of the description on the same or similar components will generally be omitted.

Figure 1:
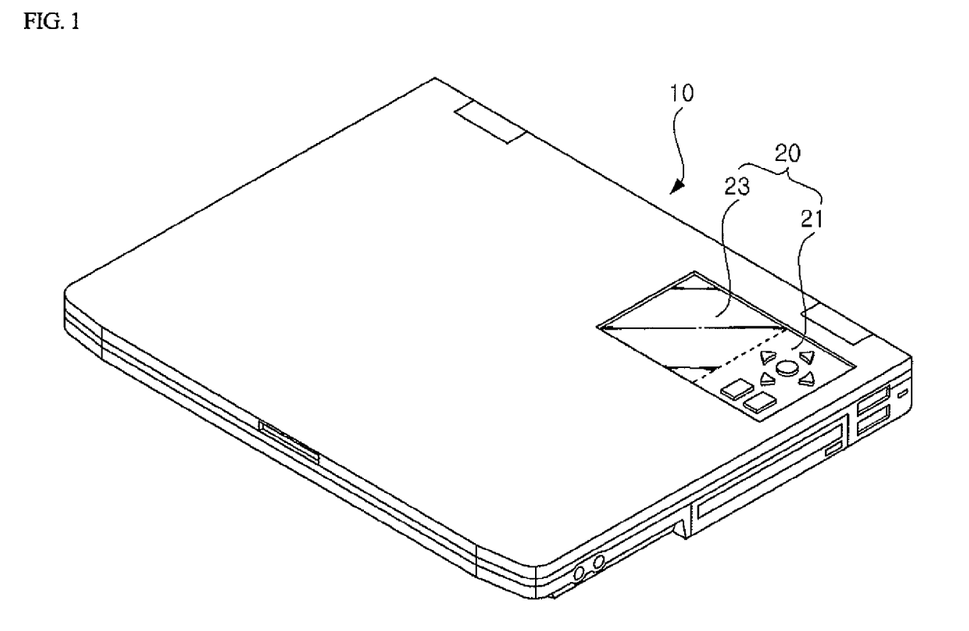
FIG. 1 is a perspective top view showing the exterior of a portable computer equipped with an auxiliary output device where the portable computer is in a closed position according to an embodiment of the present invention.
Figure 2:
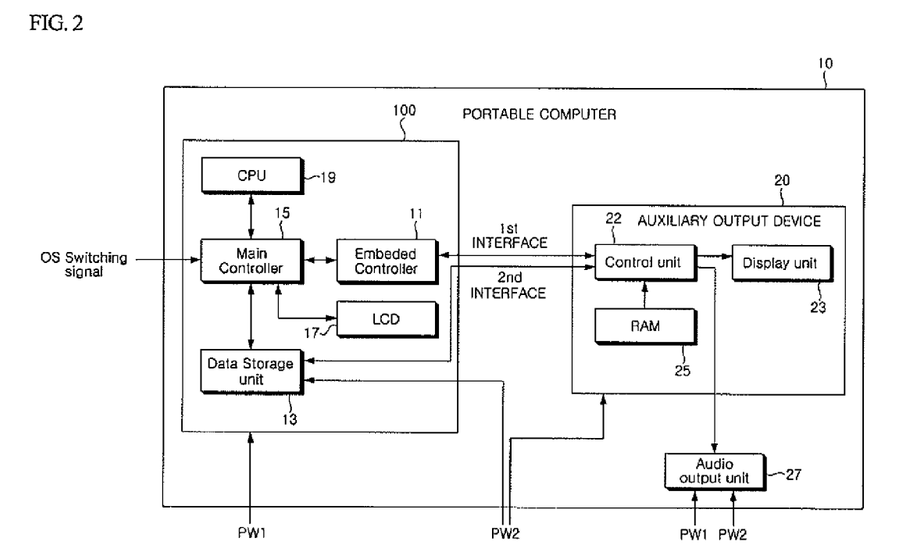
FIG. 2 is a block diagram showing the construction of an embodiment of a portable computer equipped with an auxiliary output device according to the present invention.
Figure 3:
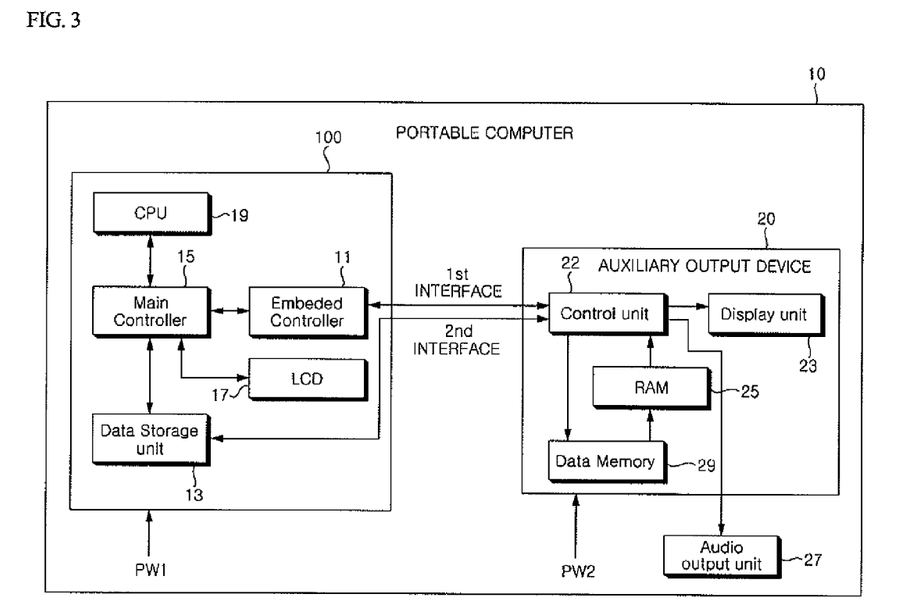
FIG. 3 is a block diagram showing the construction of another embodiment of a portable computer equipped with an auxiliary output device according to the present invention.

FIG. 1 is a perspective top view showing the exterior of one example of a portable computer in a closed position (e.g., its top is closed) and equipped with an auxiliary output device according to the present invention. FIG. 2 is a block diagram showing the construction of an embodiment of a portable computer equipped with an auxiliary output device according to the present invention. FIG. 3 is a block diagram showing the construction of another embodiment of a portable computer equipped with an auxiliary output device according to the present invention.

As shown in FIG. 1, a portable computer 10 according to the present invention has an auxiliary output device 20 positioned on one side of its outer surface. It is preferred that the auxiliary output device 20 is disposed on an outer top surface of the portable computer 10, but the invention is not limited thereto and the auxiliary output device 20 can be disposed at other locations. The auxiliary output device 20 preferably has a display window (display unit) 23 and an input unit 21 for receiving an input from a user. The display window 23 may be omitted if the auxiliary output device is solely adapted to output audio files. The portable computer 10 can include any known component such as a large LCD/display screen, wireless interface, keyboard, etc. and can be a computer laptop.

The display window 23 and the input unit 21 may be provided separately. Alternatively, a touch screen adapted for both input and output may be used. The portable computer 10 can further include an LCD or other display screen (not shown), which would be shown only when the portable computer 10 is in an open position. As a variation, a cover can be provided to selectively cover the display unit 23 and/or the input unit 21, for protecting these units and/or when these units are not in use. In another variation, the display unit 23 can be movable so that it can project out from the top surface of the portable computer 10, e.g., for better and easier viewing. For example, a small cover containing the display screen can be flipped up open from the top surface of the portable computer 10 so that the display screen is positioned at a certain angle (greater than 0 degree and less than 180 degrees) with respect to the top surface of the portable computer. In such a case, the input unit 21 can be provided on the same cover or can be provided at the top surface area as shown in FIG. 1.

The construction of the portable computer 10 according to an embodiment of the present invention will now be described with reference to FIG. 2. In this embodiment, the portable computer 10 has a main device 100 and an auxiliary output device 20, and all components of the portable computer 10 are operatively coupled and configured. The main device 100 includes a main controller 15 for controlling the overall operation of the portable computer 10, including the driving of the portable computer 10, the input/output of files, etc., a data storage unit 13, a main display unit 17 such as an LCD shown only when the portable computer 10 is opened up, a CPU 19, etc. A main OS (Operating System) used to control and run the operations of the portable computer 10 can reside in the data storage unit 13 or other suitable location. The main device 100 can further include any other known components of a conventional portable computer.

The main controller 15 is also provided with an embedded controller (hereinafter, referred to as EC) 11 for controlling the driving of the auxiliary output device 20 based on a control signal from the main controller 15. The EC 11 is used to drive the auxiliary output device 20 based on a control signal from the main controller 15 when it receives an OS (Operating System) switching signal. In that case, the main controller 15 terminates the main OS that has been running.

In order to terminate the main OS that has been running, the main controller 15 sets up a flag or other type of parameter for indicating the time of the termination of the playback of a multimedia file that has been played, before the playback is over. The flag is then transmitted to the auxiliary output device 20.

The flag may be indicated as part of the multimedia file data. Alternatively, the flag may be time information regarding the playback termination location of the multimedia file in playback. The flag will be described later in more detail with reference to FIG. 9.

The main controller 15 communicates with the data storage unit 13 for storing data and other information of the portable computer 10. The data storage unit 13 commonly includes a hard drive, and stores various types of data handled by the portable computer 10, including multimedia files.

The portable computer 10 according to an embodiment of the present invention has the auxiliary output device 20 driven by its own OS, which is referred to herein as a sub OS.

The auxiliary output device 20, as shown in FIG. 2, includes a control unit 22 for driving and controlling the auxiliary output device 20, a display unit 23, a storage unit 25 such as a RAM.

The control unit 22 uses its own OS (i.e., sub OS) to drive the auxiliary output device 20. After the main OS is terminated, the control unit 22 establishes control over the data storage unit 13, which is then used as a data storage space for the auxiliary output device 20. The sub OS can reside in the control unit 22, such in a flash memory (not shown) in the control unit 22, or in the storage unit 25.

Main power, which is generally supplied to operate the component(s) of the main device 10, is referred to herein as PW1, where as auxiliary power, which is generally supplied to operate the component(s) of the auxiliary output device 20, is referred to herein as PW2. The portable computer 10 can be configured such that PW1 and PW2 are suppliable to the component(s) of the main device.

The control unit 22 communicates with the data storage unit 13 via a second interface for direct communication with it. When the main OS is terminated/completed, then the portable computer 10 enters a suspended or off mode. Then PW1 is cut off from the main device 100, and PW2 is applied to the auxiliary output device 20, whereby electric power is saved. Power PW1 and PW2 can be battery power, power-line power, etc.

The control unit 22 is connected to the EC 11 via a first interface. This guarantees that the control unit 22 can retrieve data from the data storage unit 13 while the main OS is running. More particularly, since the control unit 22 cannot obtain control over the data storage unit 13 while the main OS is running, it relies on the EC 11 to retrieve data from the data storage unit 13 in an indirect manner.

The control unit 22 exchanges data and command signals with the main controller 15 via the first interface and the EC 11 connected to it. Particularly, the main controller 15 creates playback information, a playback termination signal informing that the playback of a multimedia file is terminated, and flag information, all of which are transmitted to the control unit 22 via the first interface.

The control unit 22 is connected with the storage unit 25, which provides a temporary storage space necessary to drive the control unit 22.

The auxiliary output device 20 includes the display unit 23, as has been described with reference to FIG. 1.

The control unit 22 is also connected to an audio output unit 27, which may be an audio output module (main module) belonging to the portable computer 10 or may be an additional audio output module separately mounted on the auxiliary output device 20 in addition to the main audio output module. The audio output unit 27 is configured to receive PW1 and/or PW2. For example, if the audio output unit 27 is the main audio output module already existing in the portable computer 20, then the main audio output module receives either PW1 or PW2 selectively depending on whether the main device 100 (PW1) or the auxiliary output device 20 (PW2) is used. If, however, the audio output unit 27 is an auxiliary audio output module, then PW1 and PW2 may not need to supplied thereto. It is advantageous in most cases to use the main audio output module of the portable computer 10 also as the audio output unit 27 of the auxiliary output device 20. However, if the auxiliary output device 20 can be removed and used as a portable device on its own, it is preferred to provide a separate (additional) audio output module as the audio output unit 27.

According to another embodiment of a portable computer equipped with an auxiliary output device according to the present invention, as shown in FIG. 3, a data memory 29 is added to the same components of the portable computer according to the foregoing embodiment of FIG. 2.

The data memory 29 acts as a data storage space for the auxiliary output device 20, and stores multimedia files transmitted by the data storage unit 13. Particularly, the data memory 29 is connected to the control unit 22 to store multimedia files from the data storage unit 13 so that the control unit 22 can read and play the multimedia files. Before the main OS is terminated (e.g., in response to the OS switching signal), a directory of files (including the files) currently being played is sent from the data storage unit 13 to the data memory 29 for storage. For example, any link information (e.g., website address, etc.) or other associated information can be sent to the data memory 29. Once this information is stored/updated in the data memory 29, then the main OS can be terminated and PW1 is turned off to turn off the entire or substantial part of the main device 100, while PW2 is tuned on to operate the sub OS and the auxiliary output device 20. In this embodiment the sub OS can be stored in the control unit 22 or the data memory 29.

The operations of the preferred embodiments of the present invention will now be described in detail with reference to a method for switching between the OSs of a portable computer equipped with an auxiliary output device.

Figure 4:
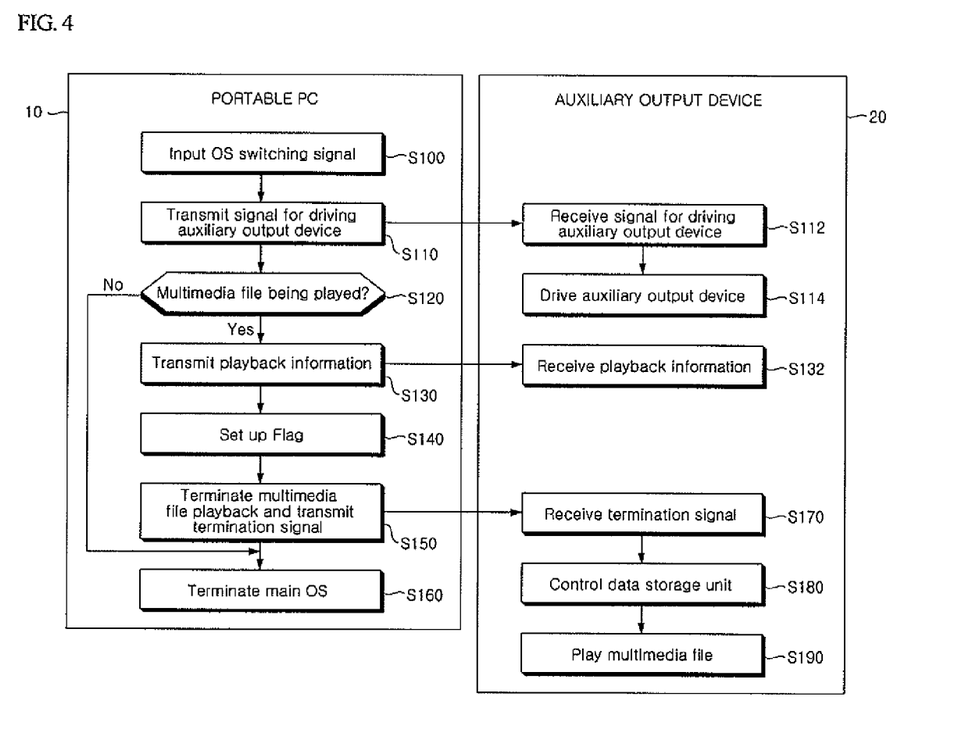
FIG. 4 is a flowchart showing a first embodiment of a method for switching the OSs of a portable computer equipped with an auxiliary output device according to the present invention.
Figure 5:
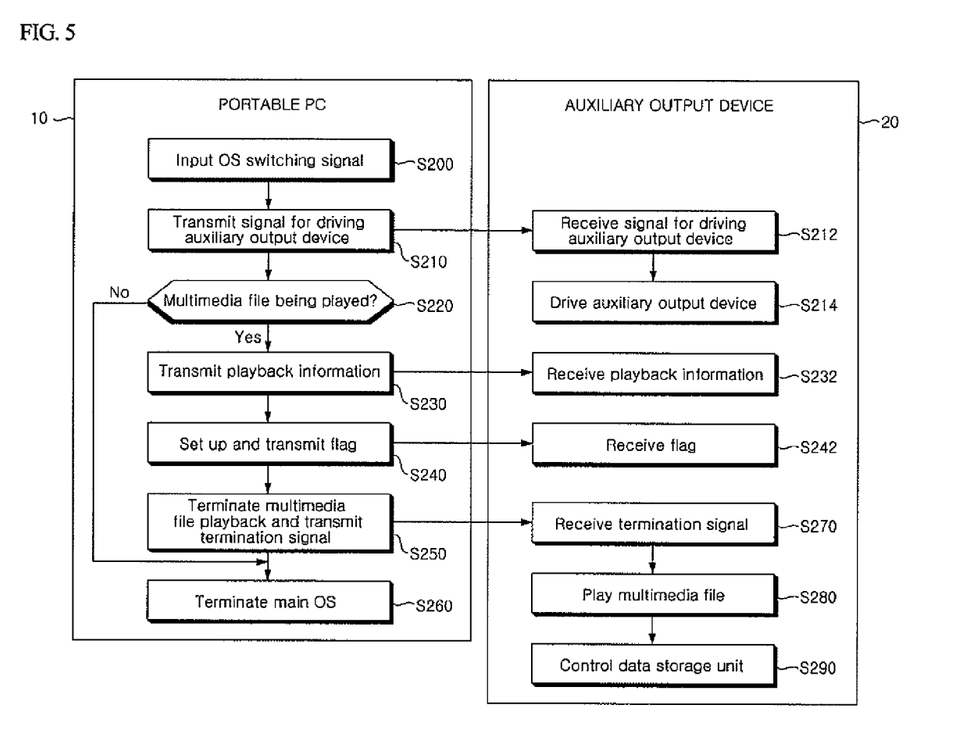
FIG. 5 is a flowchart showing a second embodiment of a method for switching the OSs of a portable computer equipped with an auxiliary output device according to the present invention.
Figure 6:
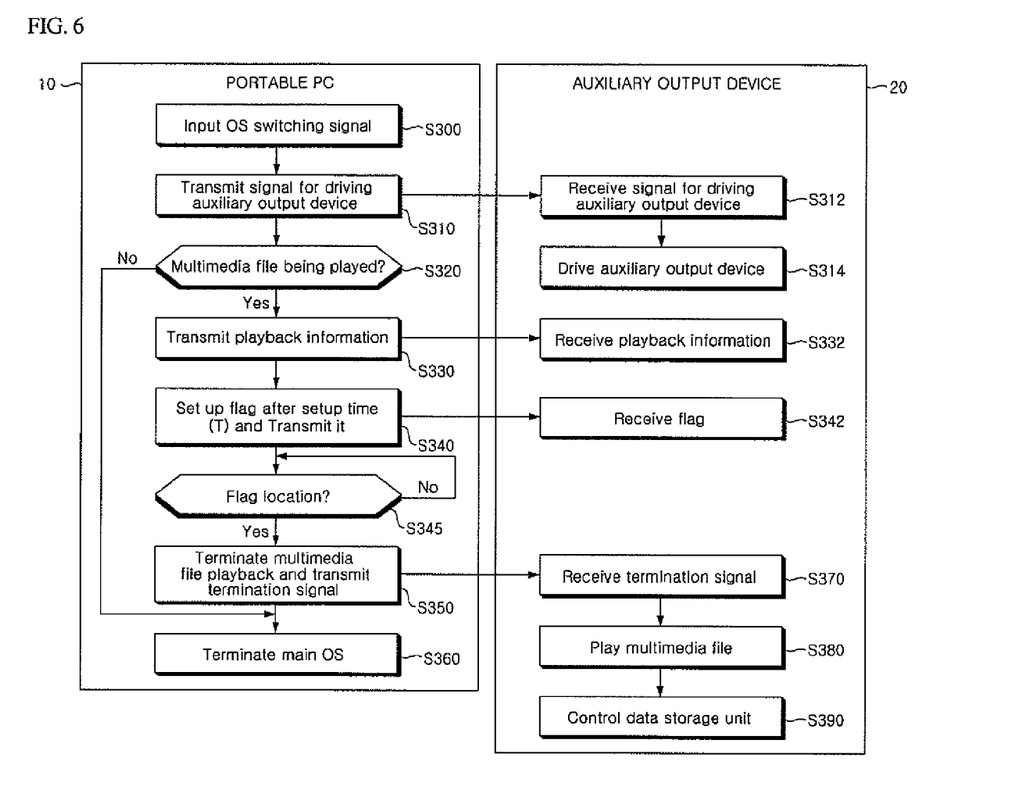
FIG. 6 is a flowchart showing a third embodiment of a method for switching the OSs of a portable computer equipped with an auxiliary output device according to the present invention.
Figure 7:
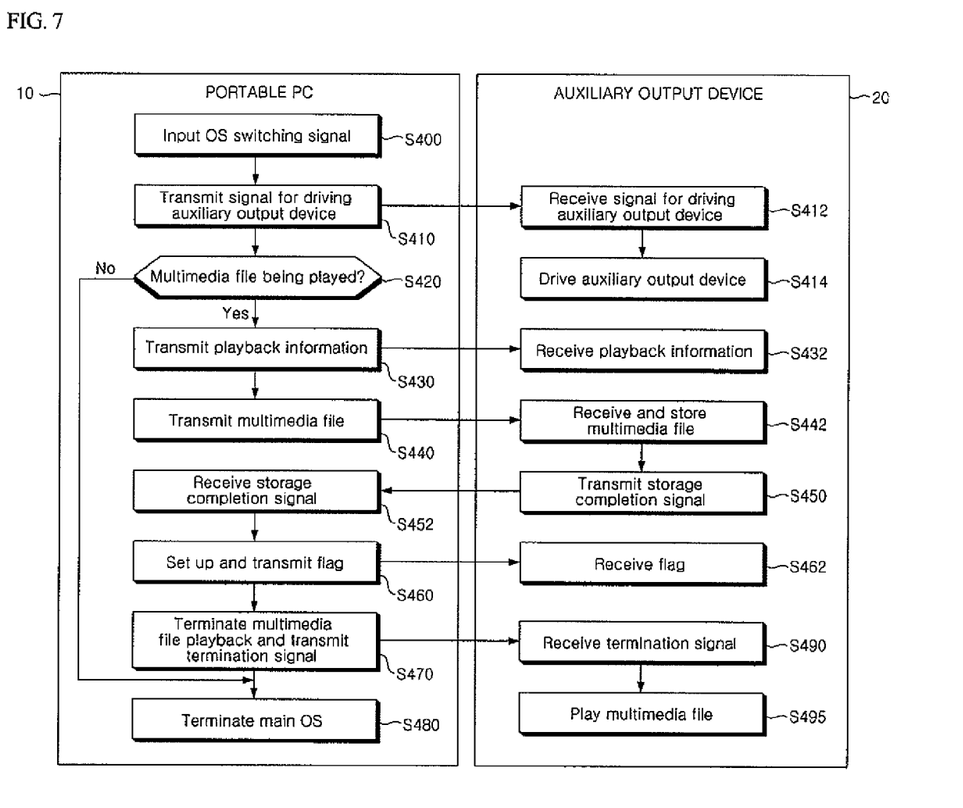
FIG. 7 is a flowchart showing a fourth embodiment of a method for switching the OSs of a portable computer equipped with an auxiliary output device according to the present invention.
Figure 8:
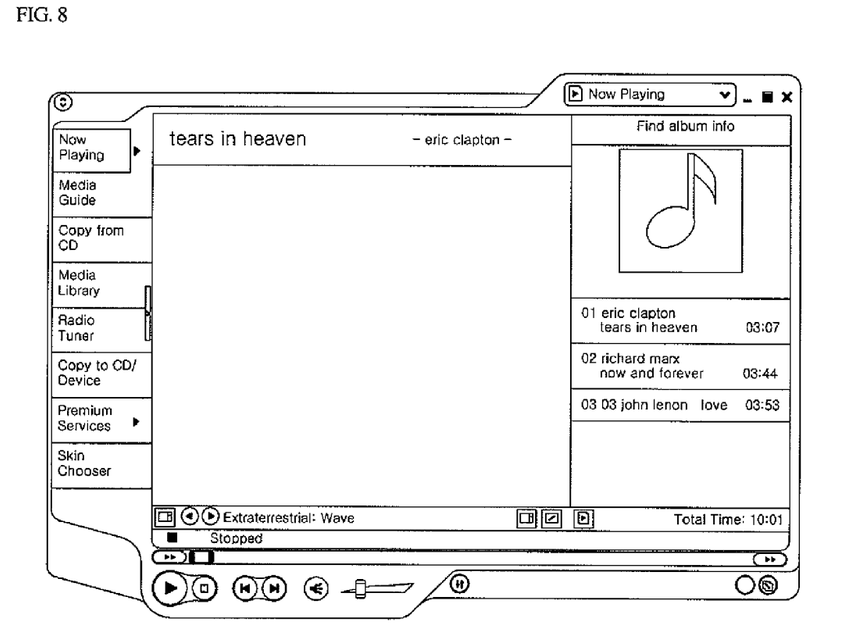
FIG. 8 shows an example of a play list transmitted to an auxiliary output device according to an embodiment of the present invention.
Figure 9:
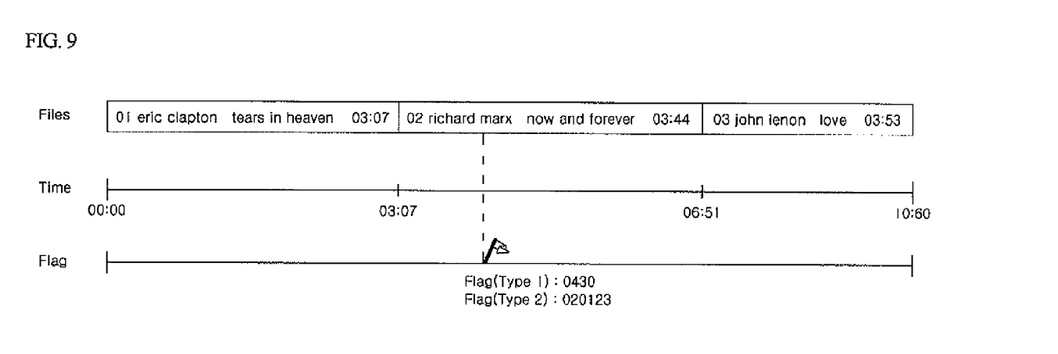
FIG. 9 conceptually shows an example of a flag used according to an embodiment of the present invention.
Figure 10:
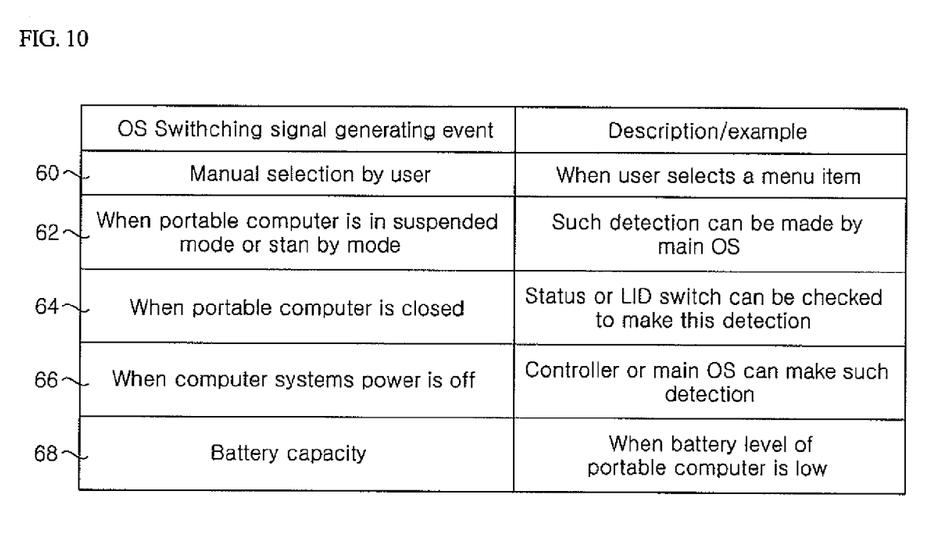
FIG. 10 shows examples of events which cause generation of an OS switching signal according to an embodiment of the present invention.

FIG. 4 is a flowchart showing a first embodiment of a method for switching the OSs of a portable computer equipped with an auxiliary output device according to the present invention. FIG. 5 is a flowchart showing a second embodiment of a method for switching the OSs of a portable computer equipped with an auxiliary output device according to the present invention. FIG. 6 is a flowchart showing a third embodiment of a method for switching the OSs of a portable computer equipped with an auxiliary output device according to the present invention. FIG. 7 is a flowchart showing a fourth embodiment of a method for switching the OSs of a portable computer equipped with an auxiliary output device according to the present invention FIG. 8 shows an exemplary play list transmitted to an auxiliary output device according to an embodiment of the present invention. FIG. 9 conceptually shows an example of a flag used according to an embodiment of the present invention. FIG. 10 shows examples of events which cause generation of an OS switching signal according to an embodiment of the present invention. The various methods as discussed below referring to FIGS. 4-7 are implementable by the portable computer of FIG. 1, 2 or 3. Further, features of these methods can be combined, replaced with other features of the methods, or added to other features of the methods. Moreover, the various examples described in connection with FIGS. 8-10 are also fully applicable to the various methods and portable computers of the present invention discussed herein.

The first embodiment of a method for switching the OSs of a portable computer according to the preset invention, referring to FIG. 4, begins by inputting an OS switching signal (S100). The OS switching signal is used to terminate the main OS of the portable computer 10 and to drive the OS (sub OS) of the auxiliary output device 20. As shown in FIG. 10, the OS switching signal may be manually inputted by a user, e.g., by selecting a particular program or hard/soft button (60); or the OS switching signal may be automatically generated within the computer 10 when the main OS is terminated. Further, the OS switching signal may be automatically generated depending on the battery capacity of the portable computer (68) (e.g., when the battery level is low), or when the portable computer is in a suspended more or standby mode (62) (e.g., when the computer is left idle for a long time), or when the cover of the portable computer 10 is closed or improperly closed (64) (e.g., when the LID switch of the computer for detecting when the top of the portable computer 10 is closed or opened, indicates that the computer is closed), or when the computer's power is turned off (66). For these events (60)-(68), the main OS or the CPU 19 or the controller 15 can detect the occurrence of such event and trigger generation of the OS switching signal. As an example of the event (68), when music is being played by the main device 100 and if the level of the battery (e.g., PW1) becomes below a certain level (e.g., 30%), then the OS switching signal can be generated automatically so that running of the main OS would be terminated and ruing of the sub OS can start. As another example of the event (68), when a movie is being played by the main device 100 and if the batter level becomes below a certain level (e.g., 50%), then the OS switching signal can be generated automatically. Other examples are possible.

Returning to FIG. 4, after the OS switching signal is inputted at step S100, the EC 11 transmits a driving signal to the auxiliary output device 20 in order to drive the auxiliary output device 20 (S110).

When the auxiliary output device 20 receives the driving signal (S112), the auxiliary output device 20 is driven to be ready for OS switching (S114). The OS of the auxiliary output device 20 (i.e., sub OS) can be an OS used in a PDA such as Pocket PC 2003 or WinCE. Steps 110 and 114 are omitted if the auxiliary output device 20 has already been driven. Therefore, it is to be noted that, although the following description of an embodiment of the present invention includes steps 110 and 114, they may be omitted if the auxiliary output device 20 is already being driven.

The main controller 15 then determines if a multimedia file is currently being played (e.g., under control of the main device 100) (S120). Here, the multimedia file encompasses an audio only file, a video only file, or a video and audio file.

If so, the main controller 15 nits playback information, which is related to an application for playing the multimedia file, to the auxiliary output device 20 (S130). The auxiliary output device 20 receives the playback information (S132).

The playback information can include, but is not limited to, a play list, which enumerates files together with their playback order and time, etc. FIG. 8 shows an example of a play list of music files to be played by a corresponding application.

The transmitted playback information preferably includes the list of files in the playback order together with their playback time, but can include additional or other information.

After transmitting the playback information to the auxiliary output device 20, the main controller 15 sets up a flag at the current playback location on the multimedia file (S140). As used herein the flag refers to information for indicating a desired location on the multimedia file and thus can be time information identifying a particular location within the multimedia file.

The main controller 15 terminates the playback of the multimedia file concurrently with the flag setup, and transmits a termination signal to the auxiliary output device 20 to inform that the playback of the multimedia file has been terminated (S150).

The main controller 15 terminates the main OS concurrently with (or subsequent to) transmitting the termination signal (S160).

After receiving the termination signal from the main controller 15, the control unit 22 of the auxiliary output device 20 recognizes the data storage unit 13 of the main device 100 and establishes control over it (S170, S180).

After establishing control over the data storage unit 13, the control unit 22 plays the multimedia files (e.g., by accessing the multimedia files stored in the data storage unit 13) in the order contained in the playback information (S190). Here, the playback information preferably is the received playback information, but can also be the playback information stored in the data storage unit 13. The control unit 22 searches for the location of the flag, which has been set up by the main controller 15, and plays the multimedia files from that location, e.g., via the audio output unit 27 and/or the display unit 23. This is for the purpose of resuming the playback from the time at which the playback has been terminated. In step S190, the multimedia file directory stored in the data storage unit 13 can be displayed on the display unit 23 of the auxiliary output device 20. As a result, the user may view what is currently being played or can select another file for reproduction under control of the sub OS.

On the other hand, if it is confirmed in step 120 that the main controller 15 is currently playing no multimedia file, steps 160, 180 and 190 are performed successively. At this time, the multimedia file directory stored in the data storage unit 13 is displayed on the display unit 23, so that the user can select a particular file for reproduction and switch to another file under control of the sub OS.

A second embodiment of a method for switching the OSs of a portable computer 10 according to the present invention, as shown in FIG. 5, begins by inputting an OS switching signal (S200), as in the case of the first embodiment of the present invention Steps S200-S232 and S250-S270 in the second embodiment may be the same as or similar to steps S100-S132 and S150-S170 of the first of the present invention After the OS switching signal has been inputted, the EC 11 transmits a driving signal to the auxiliary output device 20 (S210). Upon receiving the driving signal, the auxiliary output device 20 is driven to be ready for OS switching (S212, S214).

The main controller 15 determines if a multimedia file is currently being played (S220).

If so, playback information regarding an application for playing the multimedia file is transmitted from the main device 100 to the auxiliary output device 20 (S230). The auxiliary output device 20 then receives the playback information (S232).

After transmitting the playback information, the main controller 15 sets up a flag indicating the location of the currently played multimedia file (S240), and transmits information regarding the flag to the auxiliary output device 20 (S242). As used herein, the flag refers to information regarding a particular playback location of the multimedia file. For example, the flag can indicate the current playback location of the multimedia file, or the playback location when the playback by the main OS is terminated.

The flag may come in various types. For example, the flag may be created to indicate the time at which the playback of the multimedia file has been terminated, as shown in FIG. 9. In this case, the flag is created in connection with the play list.

Referring to one example of FIG. 9, assuming that the playback has been terminated at 1:23 (minute/second) of the second file on the play list the flag may be set to be 000430 or 02000123. In this case, 000430 means that the flag has been set up at a location corresponding to 00:04:30 our/minute/second) during the running time of entire files enumerated in the play list, and 02000123 means that the flag has been set up at a location corresponding to 00:01:23 of the second file on the play list.

The main controller 15 terminates the playback of the multimedia file concurrently with transmitting the flag information to the auxiliary output device 20, and transmits a termination signal informing that the playback of the multimedia file has been terminated to the auxiliary output device 20 (S250).

The main controller 15 terminates the main OS concurrently with transmitting the termination signal to the auxiliary output device via the EC 11 (S260).

After receiving the termination signal from the EC 11, the control unit 22 of the auxiliary output device 20 resumes the playback of multimedia files on the play list contained in the playback information form the location at which the flag has been set up (S270, S280). The control unit 22, which may not have yet obtained control over the data storage unit 13, retrieves and plays the multimedia file, e.g., via the audio output unit 27 and/or the display unit 23.

The control unit 22 then recognizes the data storage unit 13 and establishes control over it (S290).

A third embodiment of a method for switching the OSs of a portable computer 10 according to the present invention, as shown in FIG. 6, includes steps (8300-S332, S350-S390) that are the same as or similar to those of the second embodiment of the present invention (S200-S232, S250-S290).

However, the second and third embodiments may differ from each other in that, in step 340, the flag is set up at a playback location following a setup time T, not at the current playback location (or the termination playback location), and then is transmitted to the auxiliary output device 20 (S342). The setup time T is determined by considering when the auxiliary output device 20 is completely driven and when the playback information is received, and is affected by the speed depending on the specification of the control unit 22 and the communication method, etc. For example, the main controller 15 adds in the setup time T (or a certain time T) to the current playback location and then setup the flag at that 'future' location. This ensures that any interruption of playback of multimedia files and the termination of the main OS before the auxiliary output device 20 is fully driven are minimized, so as to guarantee that the auxiliary output device 20 functions appropriately.

The playback of the multimedia file(s) continues until the flag setup location is reached (S345).

After the multimedia has been played until the flag setup location is reached, steps 350-390 are conducted in the same manner as in the case of the second embodiment of the present invention.

A fourth embodiment of a method for switching the OSs of a portable computer according to the present invention, as shown in FIG. 7, includes steps S400-S432 which are the same as or similar to steps S200-S232 of the second embodiment of the present invention.

However, it is to be noted that according to the fourth embodiment of the present invention, multimedia files on the play list are transmitted to the auxiliary output device 20 after the playback information is transmitted to the auxiliary output device 20 (S440). The auxiliary output device 20 then receives the transmitted multimedia files and stores them in the data memory 29 of the auxiliary output device (see FIG. 3). Therefore, according to the fourth embodiment of the present invention, preferably the auxiliary output device 20 needs to have the data memory 29 or some other storage as a separate storage space.

The transmitted multimedia files may include all multimedia files on the play list. Alternatively, among the multimedia files on the play list only those not yet played may be transmitted in consideration of the transmission time and the storage space size (those files currently being played may be included).

After storing all of the transmitted multimedia files, the auxiliary output device 20 transmits a storage completion signal to the main controller 15 (S450). After receiving the storage completion signal, the main controller 15 sets up a flag indicating the location of the curtly played multimedia file, and transmits the flag information to the auxiliary output device 20 (S452, S460).

The flag has the same meaning as has been described with reference to the other embodiment(s) of the present invention.

The main controller 15 terminates the playback of the multimedia file concurrently with transmitting the flag information to the auxiliary output device 20, and transmits a termination signal informing that the playback of the multimedia file has been terminated to the auxiliary output device 20 (S470).

The man controller 15 terminates the main OS concurrently with transmitting the termination signal (S480).

After receiving the termination signal from the main controller 15, the control unit 22 of the auxiliary output device 20 resumes the playback of multimedia files on the play list contained in the playback information from the location at which the flag has been set up (S490, S495). The control unit 22 retrieves the multimedia files from the data memory 29 of the auxiliary output device 20 and plays them.

As mentioned above, the portable computers equipped with an auxiliary output device and the methods for switching its OSs according to the various embodiments of the present invention have the following advantages.

The auxiliary output device, which has its own OS, can be used for a specific task with minimum power consumption after terminating the main OS of the portable computer.

Even when the OSs are switched while a multimedia file is being played the playback resumes right after the time at which the file has stopped playing. This allows the user to continuously watch and/or listen to the file's contents regardless of the OS switching.

According to an embodiment of the present invention, the OS switching and the multimedia file playback can be conducted simultaneously with no (or very instantaneous) interruption of the playback.

Although the exemplary embodiments of the present invention have been described for illustrative purposes, those skilled in the art will appreciate that various modifications, additions and substitutions are possible, without departing from the scope and spirit of the invention as disclosed in the accompanying claims.

For example, the present invention also include the basic operation of receiving the user's playback command via the input unit 21, when the main OS is terminated, and playing multimedia files by the auxiliary output device 20 in response to the playback command.

What is claimed is:

1. A portable computer comprising:
    a main device configured to be driven by a first operating system (OS) and to control operations of the portable computer; and
    an auxiliary output device configured to be driven by a second OS different from the first OS,
    wherein the main device comprises a main controller, an embedded controller configured to control driving of the auxiliary output device according to a control signal from the main controller, and a data storage unit configured to store data comprising multimedia files;
    wherein the auxiliary output device comprises a control unit configured to control the data storage unit once an OS switching signal is generated in the main device during playing back of a multimedia file when the main device is to be powered off,
    wherein, when the OS switching signal is generated, the main device is configured to transmit playback related information to the auxiliary output device, to set up a flag indicating a playback termination location of the multimedia file currently being played, and to transmit a termination signal to the auxiliary output device,
    wherein the auxiliary output device is configured to establish control over the data storage unit after receiving the termination signal and to continue to play back the multimedia file from the playback termination location,
    wherein the flag is set up at a multimedia file playback location coming after a setup time (T) determined based on consideration of a setup time of the auxiliary output device, and
    wherein the main device is further configured to determine whether or not the multimedia file playback location coincides with the flag setup location, continue the playback until the multimedia file playback location coincides with the flag setup location when it has been determined that the multimedia file playback location precedes the flag setup location, and terminate the playback of the multimedia file and transmit the termination signal to the auxiliary output device when it has been determined that the multimedia file playback location coincides with the flag setup location.

2. The portable computer as claimed in claim 1, wherein the control unit is configured to determine the playback termination location of the multimedia file based on the flag information, and play the multimedia file from the multimedia playback location.

3. The portable computer as claimed in claim 1, wherein when the OS switching signal is generated, the control unit is configured to receive a play list from the main controller, and play the multimedia files in an order based on the play list from a particular multimedia playback location.

4. The portable computer as claimed in claim 1, wherein the auxiliary output device further comprises a data memory configured to receive and store the multimedia files and playback related information transmitted by the main controller.

5. The portable computer as claimed in claim 1, wherein the auxiliary output device further comprises a display unit disposed at an outer surface area of the portable computer.

6. The portable computer as claimed in claim 1, wherein the auxiliary output device comprises an interface unit, and wherein the interface unit comprises:
    a first interface configured to connect the main controller of the main device to the control unit; and
    a second interface configured to connect the data storage unit to the control unit.

7. The portable computer as claimed in claim 1, wherein the control unit of the auxiliary output device is configured to receive and store playback information from the main controller, and continues to execute a task using the stored playback information.

8. The portable computer as claimed in claim 1, wherein the auxiliary output device comprises an output unit configured to output audio data only, video data only, or audio and video data.

* * * * *